April 16, 1963 A. C. STANLEY 3,085,603
AUXILIARY COOLING MEANS FOR PORTABLE ELECTRIC JIG SAW
Filed Sept. 1, 1961 2 Sheets-Sheet 1
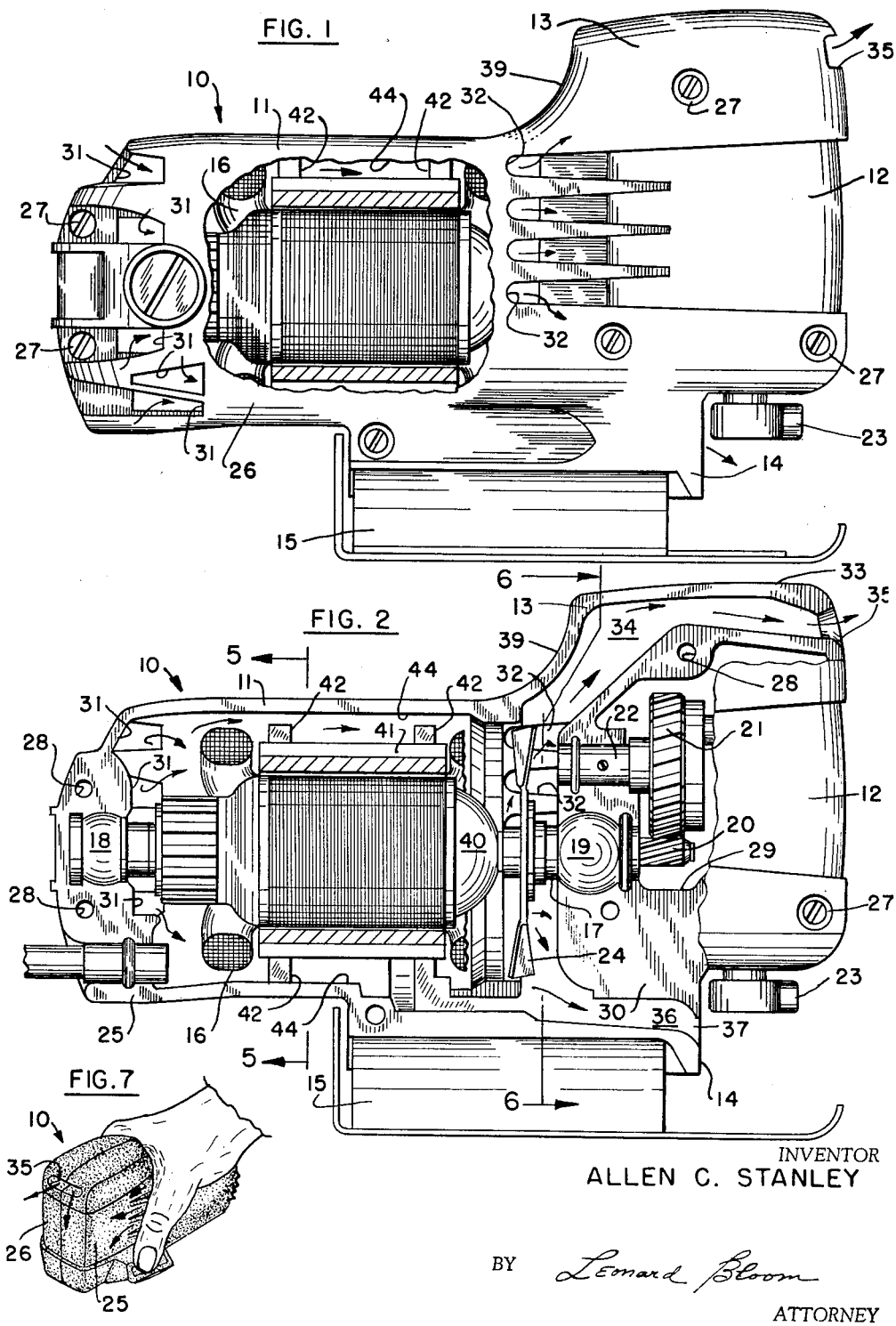
INVENTOR
ALLEN C. STANLEY
BY *Leonard Bloom*
ATTORNEY April 16, 1963  A. C. STANLEY  3,085,603
AUXILIARY COOLING MEANS FOR PORTABLE ELECTRIC JIG SAW
Filed Sept. 1, 1961  2 Sheets-Sheet 2

INVENTOR
ALLEN C. STANLEY

BY *Leonard Bloom*
ATTORNEY

United States Patent Office 3,085,603
Patented Apr. 16, 1963

3,085,603
AUXILIARY COOLING MEANS FOR PORTABLE ELECTRIC JIG SAW
Allen C. Stanley, Baltimore, Md., assignor to The Black and Decker Manufacturing Company, Towson, Md., a corporation of Maryland
Filed Sept. 1, 1961, Ser. No. 135,550
1 Claim. (Cl. 143—68)

The present invention relates to cooling means for hand-held electrically-powered devices, and more particularly, to auxiliary cooling means for a portable jig saw.

In the prior art relating to hand-held electrically-powered devices, such as a portable electric jig saw, the motive power is supplied by means of an electric motor and associated gearing and motion-translating mechanism; and the device is usually grasped firmly, with the operator's hand invariably being wrapped around the motor housing, for proper control and operation of the device. Under such circumstances, and during a sustained operation of the device, experience has shown that the device or saw becomes uncomfortably hot and consequently difficult to handle, due principally to the high heat dissipation of the powerful electric motor and its associated mechanism. Various means have been contemplated in the prior art for rectifying this problem; such means usually includes the addition of an auxiliary handle or of an overhead handle, by means of which the saw may be grasped by the operator. An overhead handle jig saw, while minimizing the holding problems associated with high heat dissipation, nevertheless, is somewhat disadvantageous in being more costly to manufacture, being slightly more cumbersome, and not affording the operator as close a degree of guidance and control as is ususally realized with a jig saw that is grasped intimately around the motor housing.

Accordingly, it is an object of the present invention to alleviate these difficulties by providing auxiliary cooling means for a portable electric jig saw, whereby the tool may be grasped around the motor and gear housing easily and comfortably for sustained periods of time by the operator.

It is another object of the present invention to provide a housing including a forwardmost raised hump portion, in combination with auxiliary cooling means including an air passageway extending beneath the raised hump portion of the housing, thus protecting the sensitive web portion of the operator's hand.

It is yet another object of the present invention to provide a cooling means for a portable electric jig saw which includes a single series of air intake openings formed in the motor housing rearwardly of the motor, and which further includes an upper air exhaust passageway, a lower air exhaust passageway, and a plurality of air exhaust openings formed in the respective side surfaces of the gear case.

It is still another object of the present invention to provide a split-housing comprising a pair of substantially-hollow relatively thin-walled complementary mating halves, including continuous internal partitions therein, whereby when the mating halves are secured together along their common longitudinal mid-plane, an enclosed gear case is formed together with an upper air passageway and a lower air pasageway disposed, respectively, above and below the enclosed gear case.

These and other objects of the present invention will become apparent from a reading of the following specification, taken in conjunction with the enclosed drawings, in which:

FIGURE 1 is a side elevational view of a portable electric jig saw with part of the housing being broken away to show the electric motor;

FIGURE 2 is a longitudinal sectional view thereof looking into the bottom half or lower half of the split-housing and showing the air flow pattern;

FIGURE 7 is a small pictorial view of the jig saw being grasped by the user.

Figure 3:
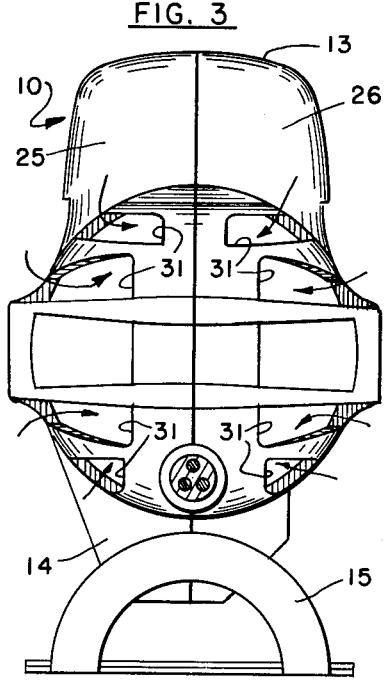
FIGURE 3 is a rear elevational view of the jig saw of FIGURE 1.

With reference to FIGURES 1 and 2, there is illustrated a portable electric jig saw 10 with which the teachings of the present invention may find more particular utility. The jig saw 10 includes a generally cylindrical motor housing 11, a gear case 12 forwardly of the motor housing 11, a raised hump portion 13 forwardly of the motor housing 11 and generally above the gear case 12, and a lowermost housing portion 14 including a supporting shoe structure 15. A motor 16 is contained in the motor housing 11 and has an armature shaft 17 associated therewith. The armature shaft 17 is journaled fore and aft in bearings 19 and 18, respectively and protrudes partially within the gear case 12. A pinion 20 is formed on the end of the armature shaft 17 and engages a suitable gear 21; gear 21 is carried by a stub shaft 22, which is in turn secured within the gear case 12. A reciprocating shaft having a protruding portion 23 is journaled within the gear case 12, and means (not shown) are provided within the gear case 12 for mechanically coupling the gear 21 to the reciprocating shaft 23 so as to impart a reciprocating movement to the shaft 23. A suitable saw blade (not shown) may then be coupled to the reciprocating shaft 23. Moreover, a fan 24 is carried by the armature shaft 17 between the motor 16 and gear case 12.

Figure 4:
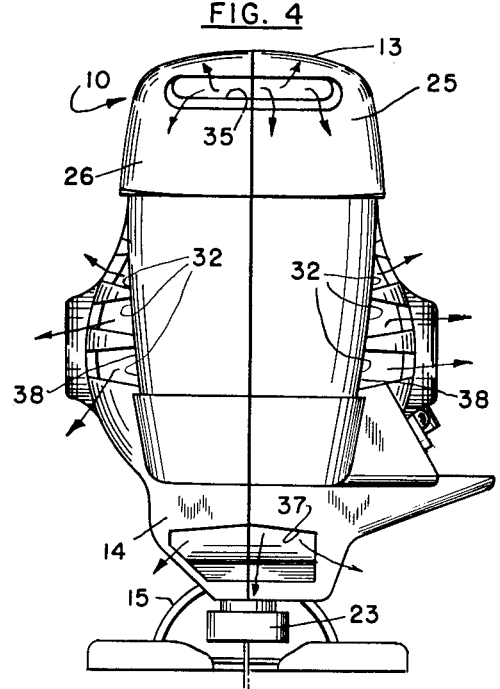
FIGURE 4 is a front elevational view of the jig saw showing the various air discharge openings.
Figure 6:
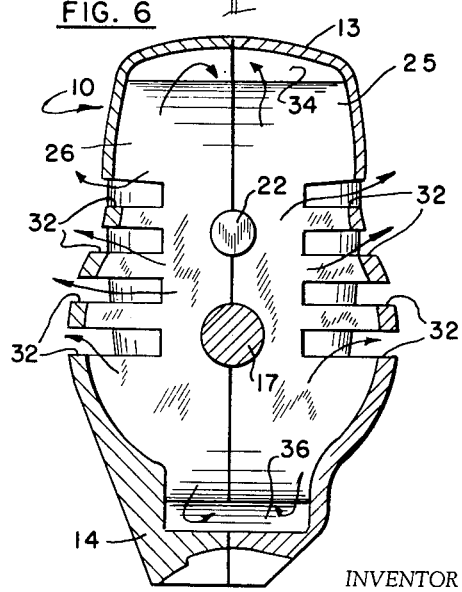
FIGURE 6 is a sectional view taken along the lines 6—6 of FIGURE 2.

With reference to FIGURES 3, 4, and 6, and with reference again to FIGURES 1 and 2, the jig saw 10 is of the split-housing type and includes a pair of substantially-hollow relatively thin- walled complementary mating halves 25 and 26. The mating halves 25 and 26 meet in a common longitudinal vertical midplane and are detachably secured together by means of a plurality of screws, one of which is indicated as at 27, which are adapted to engage suitable threaded recesses 28 formed in the mating half 25. Thus, one of the mating halves 25 is deemed the bottom half or lower half, in which the component parts of the saw 10 are assembled; and the other mating half 26 then constitutes a cover for the mating half 25. Moreover, each of the mating halves 25 and 26 includes a continuous internal partition 29 (see FIGURE 2); and each of the partitions 29 have an uppermost flat surface 30, which is substantially co-planar with the common longitudinal vertical midplane of the split-housing of saw 10. The partitions 29 are complementary and join each other at the longitudinal vertical midplane, when the mating halves are secured together; and in such a manner, the enclosed gear case 12 is formed forwardly of the motor housing 11. The motor housing 11 is provided with a plurality of air intake openings 31 rearwardly of the motor 16; and the gear case 12 has respective side surfaces 38 which include a plurality of air exhaust openings 32 formed therein. The raised hump portion 13 includes a relatively-thin wall 33, and the raised hump portion 13 together with the enclosed gear case 12 form an upper air passage-way 34 therebetween. The raised hump portion 13 has a forward air exhaust opening 35 formed therein above the gear case 12, and the upper air passageway 34 terminates at the forward air exhaust opening 35. Furthermore, the lowermost housing portion 14 has a lower air passageway 36 formed therein between the supporting shoe structure 15 and the gear case 12; and a forward air exhaust opening 37 is provided in the lowermost housing portion 14 near the protruding portion of the reciprocating shaft 23, the lower air passageway 36 terminating in the forward air exhaust opening 37.

With reference again to FIGURE 2, it will be appreciated that the upper air passageway 34, in longitudinal section, bends gradually up and over the enclosed gear case 12; and with reference again to FIGURES 4 and 6, it will be further appreciated that the upper air passageway 34 and the forward air exhaust opening 35 are approximately rectangular in cross section. Furthermore, the plurality of air exhaust openings 32 formed in the respective side openings of the enclosed gear case 12 comprises a series of substantially-parallel longitudinal slotted openings, each of the openings being axially adjacent the fan 24 and being radially spaced of the fan 24. As shown more particularly in FIGURE 1, each of the air exhaust openings 32 continue axially forward of the fan 24 and terminate in a blend in the respective side surfaces 38 of the gear case 12. The lower air passageway 36, together with the forward air exhaust opening 37 associated therewith, are also approximately rectangular in cross section.

In such a manner, it will be appreciated that the fan 24 draws cooling air from the air intake openings 31 into motor housing 11 and around the motor 16 to be discharged via the upper air passageway 34, the air exhaust openings 32 in the respective side surfaces 38 of the gear case 12, and the lower air passageway 36. Consequently, the motor 16, the gear case 12, and the raised hump portion 13 are kept relatively cool, so as to allow the saw 10 to be grasped firmly and comfortably by the user; and moreover, an air chip-disposal stream is provided in the vicinity of the work being cut, this stream being passed along the lower air passageway 36.

As shown in FIGURES 1 and 2, the forwardmost raised hump portion 13 includes a rearwardly-facing surface 39 that blends in with the motor housing 11, such that in the operation of the saw 10 (as shown more particularly in FIGURE 7) the saw 10 is grasped by the user's hand with the thumb on one side of the housing and the fingers extending around the other side of the housing, and with the web portion of the user's hand (which is the most sensitive portion of the hand) being disposed adjacent to the rearwardly facing surface 39 of the forwardmost raised hump portion 13.

Figure 5:
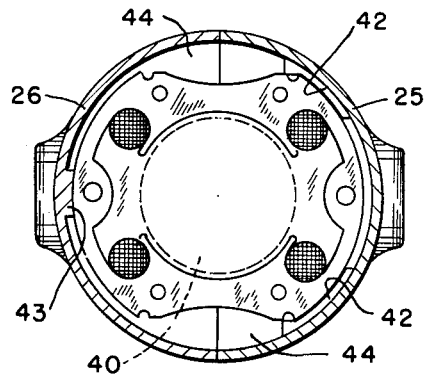
FIGURE 5 is a sectional view taken along the lines 5—5 of FIGURE 2.

With reference again to FIGURES 2 and 5, the motor 16 includes an armature 40 and an outer stationary field portion 41 around the armature 40. One of the mating halves 25 has a pair of internally-projecting lands 42 circumferentially-spaced with respect to each other; and the other mating half 26, which constitutes the cover, is provided with an internally-projecting lug 43. The lug 43 is diametrically-opposite the approximate midpoint between the circumferentially-spaced lands 42, so that stationary field portion 41 of the motor 16 may be trapped between the lug 43 and the lands 42 when the mating halves 25 and 26 are secured together. With reference again to FIGURE 5, it will be further appreciated that the mating halves 25 and 26, and the field portion 41 have a radial clearance therebetween circumferentially intermediate of the lug 43 and the lands 42 thereby forming a series of longitudinal air passageways 44 in the motor housing 11 for the purpose of cooling the motor 16 by the air flow pattern depicted by means of the small arrows in the drawings.

Obviously, many modifications may be made without departing from the basic spirit of the present invention; and accordingly, within the scope of the appended claim, the invention may be practiced other than has been specifically described.

I claim:

Cooling means for a portable electric tool, comprising in combination:

(a) a split-housing including a pair of relatively thin-walled substantially-hollow complementary mating halves secured together along a common longitudinal midplane;

(b) said split-housing having a substantially cylindrical rearward portion forming a motor housing;

(c) each of said mating halves of said split-housing having a continuous internal partition;

(d) said partitions each extending from one surface to an adjoining surface, and each of said partitions having a raised flat surface which is substantially co-planar with said common longitudinal midplane to form a totally-enclosed gear case forwardly of said motor housing when said mating halves are secured together;

(e) each of said mating halves of said split-housing further having an uppermost relatively-thin wall above said gear case;

(f) each of said last-named walls having a rearwardly facing portion that blends in with said motor housing, and each of said last-named walls joining together at said common longitudinal midplane to form a raised hump portion forwardly of said motor housing and above said gear case, whereby the operator may grip the tool such that his fingers extend around said motor housing and such that the web portion of his hand contacts said rearwardly-facing portion of said raised hump;

(g) each of said last-named walls being separated from its respective partition to form an upper air passageway in said raised hump portion when said mating halves are secured together;

(h) a rotating fan between said motor housing and said partitions;

(i) a motor in said motor housing;

(j) means to drive said fan from said motor;

(k) a plurality of air intake openings rearwardly in said motor housing;

(l) a plurality of substantially-parallel longitudinally-slotted air exhaust openings radially of said fan, each of which blend into the respective side surface of said gear case, whereby, as the air is discharged forwardly of the tool, said motor housing is cooled;

(m) said fan discharging a portion of the cooling air into said upper air passageway;

(n) an upper air exhaust opening in said raised hump portion, completely forwardmost of the tool, and above said partitions forming said gear case; and (o) said upper air passageway terminating at said upper air exhaust opening, whereby said raised hump portion and said gear case are cooled and the air is discharged forwardly of the tool.

References Cited in the file of this patent

UNITED STATES PATENTS

| | | |
|---|---|---|
| 2,639,737 | Forsberg | May 26, 1953 |
| 2,737,984 | Bruck | Mar. 13, 1956 |
| 2,779,883 | Schumann | Jan. 29, 1957 |
| 2,866,485 | Anton | Dec. 30, 1958 |
| 2,965,774 | Rangus | Dec. 20, 1960 |
| 2,984,757 | Papworth | May 16, 1961 |